US006954059B1

(12) United States Patent
MacLean

(10) Patent No.: US 6,954,059 B1
(45) Date of Patent: Oct. 11, 2005

(54) METHOD AND APPARATUS FOR OUTPUT VOLTAGE TEMPERATURE DEPENDENCE ADJUSTMENT OF A LOW VOLTAGE BAND GAP CIRCUIT

(75) Inventor: William MacLean, Oro Valley, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 155 days.

(21) Appl. No.: 10/417,379

(22) Filed: Apr. 16, 2003

(51) Int. Cl.[7] .................................................. G06F 3/16
(52) U.S. Cl. ....................................... 323/316; 323/280
(58) Field of Search ................................ 323/312, 313, 323/314, 315, 316, 274, 280, 282

(56) References Cited

U.S. PATENT DOCUMENTS 6,087,820 A * 7/2000 Houghton et al. .......... 323/315
6,340,882 B1 * 1/2002 Chung et al. ............... 323/315
6,433,529 B1 * 8/2002 Chowdhury ................ 323/316

* cited by examiner

*Primary Examiner*—Jessica Han

(57) ABSTRACT

Adjustment of the temperature dependence of the output voltage of a band gap circuit is achieved by intentionally mismatching currents flowing through nodes coupled to the inputs of an amplifier. Each node is coupled to a bipolar junction transistor and a resistor, such that an output voltage of the band gap circuit varies due to the temperature dependence of currents through the bipolar junction transistors and the temperature dependence of currents flowing through the resistors. Networks of parallel metal oxide semiconductor transistors are coupled to each node, with one network including transistors that may be selectively switched into or out of the network to adjust the effective channel width for that network, thereby altering the ratio of effective channel widths and adjusting the temperature dependence of the band gap circuit's output voltage.

20 Claims, 3 Drawing Sheets

METHOD AND APPARATUS FOR OUTPUT VOLTAGE TEMPERATURE DEPENDENCE ADJUSTMENT OF A LOW VOLTAGE BAND GAP CIRCUIT

TECHNICAL FIELD OF THE INVENTION

The present invention is directed, in general, to band gap circuits used in generating a reference voltage and, more specifically, to adjusting the temperature-dependent slope of a band gap reference voltage.

BACKGROUND OF THE INVENTION

Within integrated circuits, a need frequently arises for a stable temperature independent reference signal substantially free of thermal drift, commonly generated using a band gap circuit. FIG. 4 depicts one possible implementation of a band gap circuit, circuit 400.

Fabrication of band gap circuit 400 in a manner producing consistent output, with only negligible variation between different instances, is difficult. From one lot to another, or across different fabrication processes or sites, the temperature dependence of the output voltage for different instances of the circuit may vary. For this reason, adjustment of the band gap circuit's output voltage temperature dependence may be necessary in specific instances.

The temperature dependence of a standard band gap circuit is typically adjusted by either injecting currents into the emitter of one of bipolar junction transistors Q1 or Q2, or by adjusting the resistance Rp. However, because the output voltage is regulated in a standard band gap circuit, the rail voltages (the upper and lower power supply voltages) generally must be several hundred millivolts (mV) greater than the actual output voltage, which can significantly impact the circuit's power consumption and usefulness.

In low power/low voltage (e.g., battery powered) applications, the output voltage of the band gap circuit is typically left unregulated, allowing the band gap circuit to have an output voltage lower than the band gap of silicon and to operate on a rail voltage that is lower than the band gap of silicon.

Adjusting the output voltage temperature dependence of a low voltage band gap circuit by adjusting resistance Rp is not advantageous since the voltages on either side of that resistor may not be sufficient to allow a switch to turn on, which is especially true as the rail voltage approaches its minimum. Moreover, while modifying the value of the resistance Rp by laser trimming is possible, such processing adds significant expense and is therefore undesirable. Injecting a current into transistor Q1 or Q2 in a low power band gap circuit is not optimal since the temperature coefficient of the injected current would not likely match the temperature coefficient of the current normally passing through those transistors, which will effect the temperature dependence of the output voltage.

There is, therefore, a need in the art for cost-effective adjustment of the temperature dependence for low voltage band gap circuits.

SUMMARY OF THE INVENTION

To address the above-discussed deficiencies of the prior art, it is a primary object of the present invention to provide, for use in an integrated circuit, adjustment of the output voltage temperature dependence in a band gap circuit, which is achieved by intentionally mismatching currents flowing through nodes coupled to the input of an amplifier. Each node is coupled to a bipolar junction transistor and a resistor, such that an output of the band gap circuit varies due to the summation of the temperature-dependence of currents flowing through the bipolar junction transistors with the temperature dependence of the currents flowing through the resistors. Networks of parallel metal oxide semiconductor transistors are coupled to each node, with one network including transistors that may be selectively switched into or out of the network to adjust the effective channel width for that network, thereby altering the ratio of effective channel widths, consequently altering the magnitude of the currents flowing in the bipolar junction transistors, and thereby adjusting the temperature dependence of the band gap circuit's output voltage.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
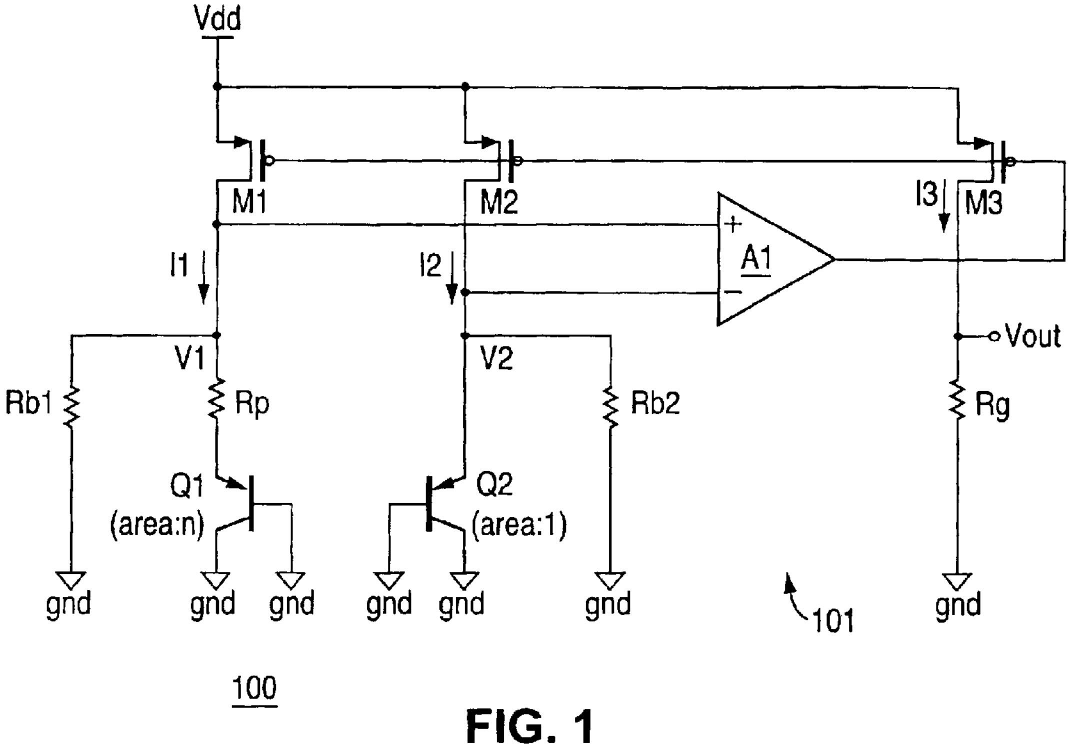
FIG. 1 depicts a circuit diagram for a low voltage band gap circuit in which adjustment of the temperature dependence of the output voltage may be implemented according to one embodiment of the present invention.
Figure 2:
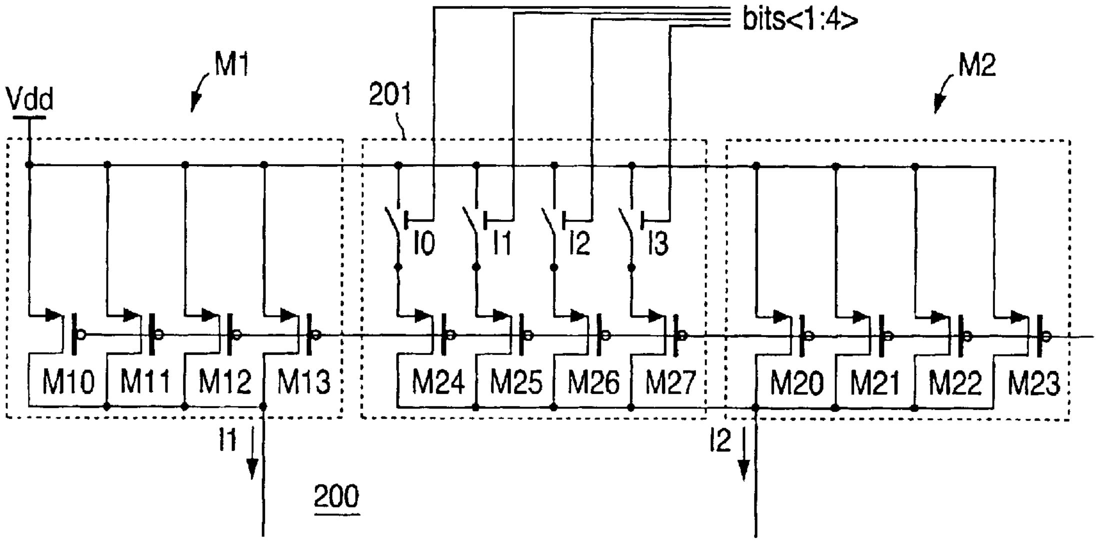
FIG. 2 depicts a circuit diagram for a transistor network employed to adjust the temperature dependence of a band gap circuit's output voltage according to one embodiment of the present invention.
Figure 3:
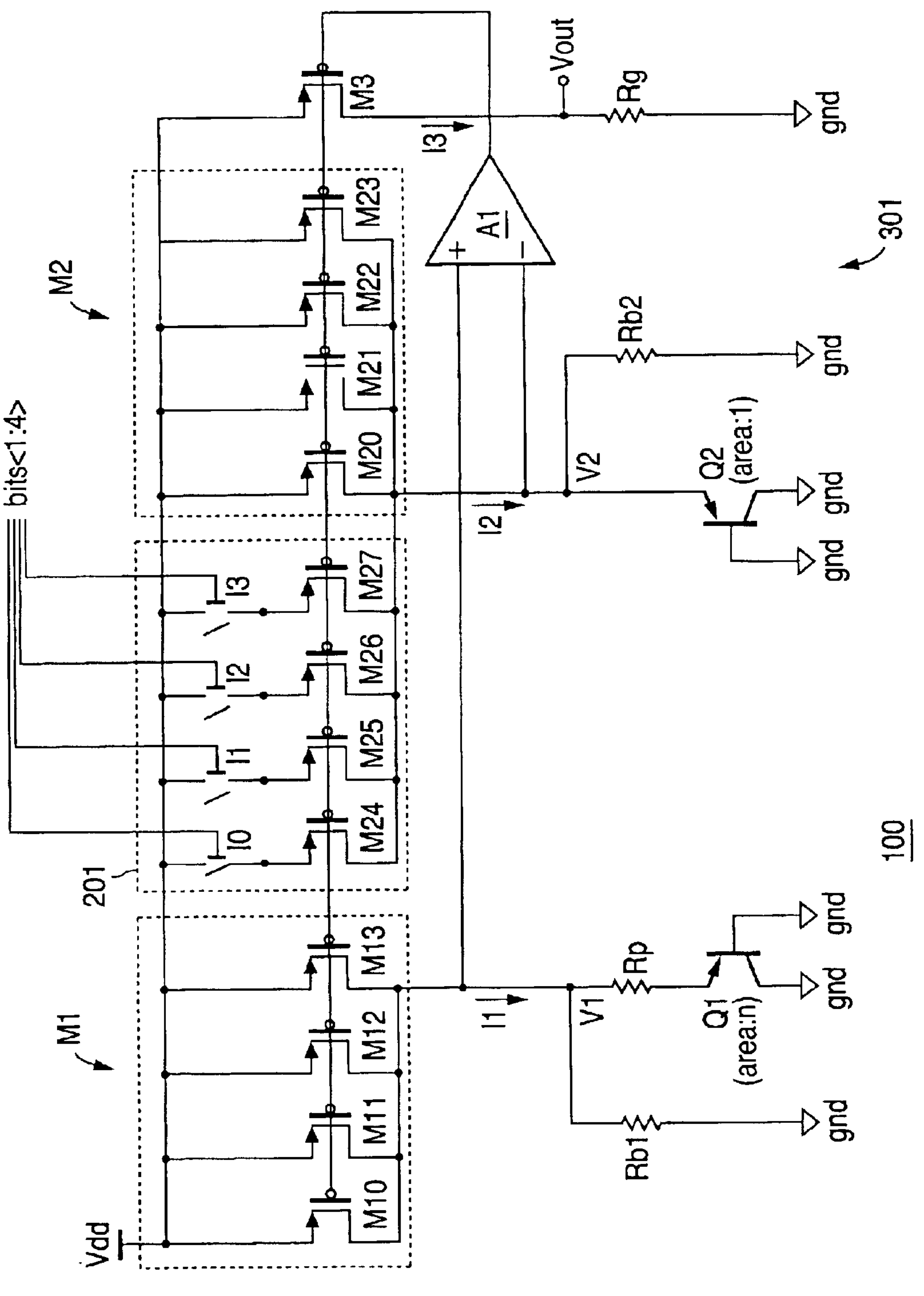
FIG. 3 depicts a circuit diagram for a low voltage band gap circuit implementing adjustment of the output voltage's temperature dependence according to one embodiment of the present invention.
Figure 4:
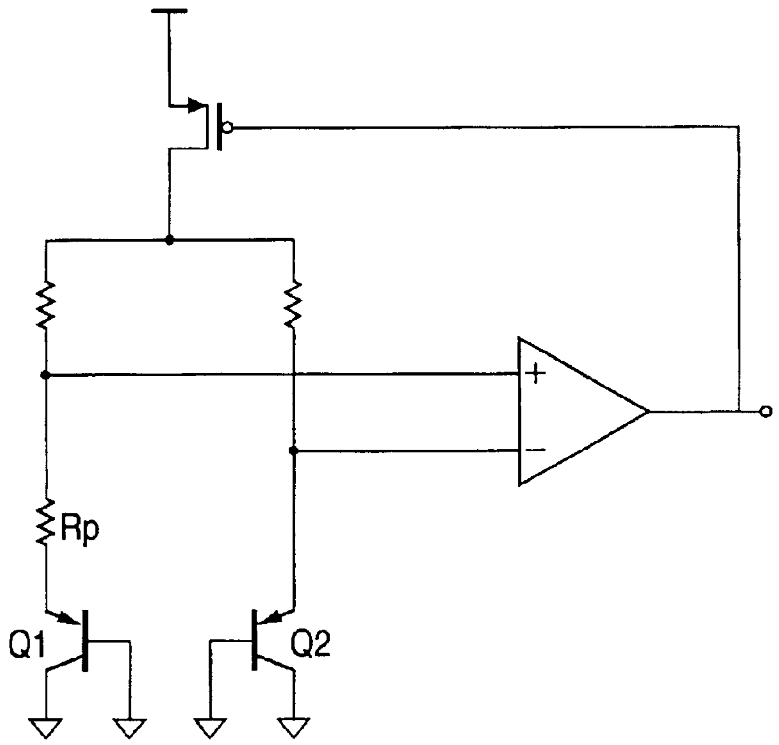
FIG. 4 depicts one possible implementation of a band gap circuit circuit.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a circuit diagram for a low voltage band gap circuit in which slope adjustment may be implemented according to one embodiment of the present invention. Band gap circuit 101 is implemented within an integrated circuit 100. For simplicity and clarity, the complete structure and operation of a suitable integrated circuit is not depicted and described. Instead, only so much of the structure and operation of a band gap circuit and an integrated circuit including such a band gap circuit as are unique to the present invention or necessary for an understanding of the present invention are depicted and described, as will be recognized by those skilled in the art.

Band gap circuit 101 includes two pnp bipolar junction transistors (BJTs) Q1 and Q2 each connected at the base and collector to a ground voltage gnd. The emitter of transistor Q1 is connected through a resistor Rp to a positive input of an amplifier A1 (node V1), while the emitter of transistor Q2 is connected directly, without an intermediate resistor, to a negative input of the amplifier A1 (node V2). As illustrated, transistor Q1 preferably has an emitter area that is n (where nominally n=4) times larger than the emitter area of transistor Q2 to allow targeting of zero mean temperature dependence that may be altered using the invention.

Amplifier A1 is preferably a low voltage circuit using a rail voltage lower than the band gap of silicon, and likewise having a maximum output voltage lower than the band gap of silicon. In the exemplary embodiment, resistors Rb1 and Rb2 are of equal value and are connected in parallel with transistor Q1 and resistor Rp and with transistor Q2, between nodes V1 and V2, respectively, and the ground voltage gnd. A suitable exemplary resistance value for resistor Rp is 500 kiloOhms (KΩ), while a suitable exemplary resistance value for resistors Rb1 and Rb2 is 2 megaOhms (MΩ).

Band gap circuit 101 includes three p-channel metal oxide semiconductor field effect transistors (MOSFETs) M1, M2 and M3 each connected at the source to a power supply voltage Vdd and at the gate to an output of amplifier A1. The drain of transistor M1 is connected to node V1 and the drain of transistor M2 is connected to node V2. The drain of transistor M3 is connected through a resistor Rg to the ground voltage gnd, with the terminal of resistor Rg that is connected to transistor M3 forming the output node Vout for the band gap circuit 101. A suitable exemplary resistance value for resistor Rg is 1 MΩ. Transistor M3 is preferably matched to transistor M1.

In operation, the output voltage Vout of band gap circuit 101 is dependent on the temperature T of the integrated circuit 100. The output voltage's temperature dependence may be coarsely controlled by appropriate selection of values for elements within band gap circuit 101, including (but not limited to) the resistances of resistors Rp, Rb1 and Rb2. Precision adjustment of the output voltage's temperature dependence is achieved in the present invention by mismatching the currents I1 and I2 flowing in transistors M1 and M2, respectively. This is achieved by intentionally mismatching the geometries of transistors M1 and M2, specifically the effective widths W1 and W2 of the channels for transistors M1 and M2, respectively, as described in further detail below.

Since the amplifier A1 keeps the voltages at nodes V1 and V2 equal and resistors Rb1 and Rb2 have the same resistance value, the current through resistor Rb1 is equal to the current through resistor Rb2. Therefore, the differences in currents I1 and I2 due to the intentional geometry mismatch manifests predominantly in transistors Q1 and Q2. While changes in diode current through transistors Q1 and Q2 will alter the voltages at nodes V1 and V2, only the direct current (DC) term is affected, and that variance may be easily adjusted out.

The voltage $V_{Rp}$ across resistor Rp resulting from imbalance of the currents I1 and I2 may be approximated by:

$$V_{Rp} = \frac{k*T}{q} * \ln\left(n * \frac{W2}{W1}\right) \qquad (1)$$

where k is Boltzmann's constant, q is the magnitude of electronic charge, and n is the ratio of the emitter area of transistors Q1 and Q2. Mismatching I1 and I2 in this manner creates a small additional non-linear temperature dependent term, but the magnitude of the contribution of that term to the overall temperature dependence of the band gap circuit 101 is small, and has a first order component for which compensation may be easily realized.

As is apparent from equation (1), the temperature dependence of the voltage $V_{Rp}$ can be modified by changing the relative geometries of M2 and M1. Therefore the temperature dependence of the output voltage Vout is also modified, since current I3 mirrors current I1.

FIG. 2 depicts a circuit diagram for a transistor network employed to adjust the temperature dependence of a band gap circuit's output voltage according to one embodiment of the present invention. To adjust the ratio of widths W1 and W2 for transistors M1 and M2, a transistor network 200 is used to offset the geometries of the two transistors. Transistors M1 and M2 are broken into an equal number of unit devices, with transistors M10 through M13 replacing transistor M1, connected in parallel between the power supply voltage Vdd and node V1, and transistors M20 through M23 replacing transistor M2, similarly connected in parallel between the power supply voltage Vdd and node V2. Transistors M10 through M13, in aggregate, match transistor M3—that is, the aggregate effective width of transistors M10 through M13 equals the width of transistor M3. Preferably transistors M20 through M23, in aggregate, similarly match transistor M3.

In addition, a group 201 of further unit devices M24 through M27 are provided that may be selectively switched into parallel connection with transistors M20 through M23 between the power supply voltage Vdd and node V2, adding more geometry to transistor M2 and increasing the effective width W2. Transistors M24 through M27 may be individually or collectively switched into parallel connection with transistors M20 through M23 using control signals bits<1:4> and switching devices I0 through I3. In an alternative embodiment, transistors within group 201 may be weighted or graded, having varying individual widths rather than having unit widths. In addition, the number of devices that transistors M1 and M2 are divided into, and the number of devices within group 201, may be varied.

FIG. 3 depicts a circuit diagram for a low voltage band gap circuit implementing adjustment of the output voltage's temperature dependence according to one embodiment of the present invention. Band gap circuit 301 incorporates the transistor network depicted in FIG. 2, allowing adjustment of the output voltage's temperature dependence in the manner described above. While the exemplary embodiment relates to a low voltage application, those skilled in the art will recognize that the present invention may be employed to adjust output voltage temperature dependence in any unregulated band gap circuit.

The present invention allows the temperature-dependence of the output for a band gap circuit to be adjusted after fabrication of an integrated circuit to compensate for process variations. Intentionally mismatching geometries to adjust temperature dependence according to the present invention provides an effective and reliable means of achieving a desired performance characteristic. The invention is particularly advantageous in low voltage band gap circuits operating with a minimum rail voltage lower than the band gap of silicon.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A band gap circuit comprising:

an amplifier having first and second inputs coupled to first and second nodes, respectively;

first and second devices coupled to the first and second nodes, respectively, wherein an output voltage of the band gap circuit is a function of temperature dependent currents through the first and second devices; and first and second networks of devices coupled to the first and second nodes, respectively, wherein one of the first and second networks includes at least one device that is selectively switched into or out of connection within the respective network to alter a current flowing through a corresponding one of the first and second nodes.

2. The band gap circuit according to claim 1, wherein the first and second devices are bipolar junction transistors, the first and second networks comprise parallel-connected metal oxide semiconductor (MOS) transistors, and the at least one device comprises an MOS transistor.

3. The band gap circuit according to claim 2, wherein selectively switching the at least one MOS transistor into or out of connection within one of the first and second networks of MOS transistors alters an effective channel width of the respective network.

4. The band gap circuit according to claim 2, wherein selectively switching the at least one MOS transistor into or out of connection within one of the first and second networks of MOS transistors alters a temperature dependence of the output voltage of the band gap circuit.

5. The band gap circuit according to claim 2, further comprising:

a device mirroring current through the first network, wherein the output voltage of the band gap circuit is taken at a terminal of the current mirroring device.

6. The band gap circuit according to claim 5, wherein the current mirroring device comprises an MOS transistor having a channel width equal to an effective channel width of the first network of MOS transistors.

7. The band gap circuit according to claim 1, wherein the band gap circuit operates with a minimum rail voltage less than or equal to a band gap for silicon.

8. A method of adjusting the output voltage temperature dependence of a band gap circuit including an amplifier having first and second inputs coupled to first and second nodes, respectively, first and second devices coupled to the first and second nodes, respectively, wherein an output voltage of the band gap circuit is a function of temperature dependent currents through the first and second devices, and first and second networks of devices coupled to the first and second nodes, respectively, wherein the method comprises:

selectively switching at least one device into or out of connection within one of the first and second networks to alter a current flowing through a corresponding one of the first and second nodes.

9. A method of adjusting the output voltage temperature dependence of a band gap circuit, the method comprising:

driving first and second inputs of an amplifier with voltages at first and second nodes, respectively;

drawing current through first and second devices from the first and second nodes, respectively, wherein an output voltage of the band gap circuit is a function of temperature dependent currents through the first and second devices;

passing current from first and second networks of devices to the first and second nodes, respectively; and selectively switching at least one device into or out of connection within one of the first and second networks to alter a current flowing through a corresponding one of the first and second nodes.

10. The method according to claim 9, wherein the first and second devices are bipolar junction transistors, the first and second networks comprise parallel-connected metal oxide semiconductor (MOS) transistors, and the at least one device comprises an MOS transistor.

11. The method according to claim 10, wherein selectively switching the at least one MOS transistor into or out of connection within one of the first and second networks of MOS transistors alters an effective channel width of the respective network.

12. The method according to claim 10, wherein selectively switching the at least one MOS transistor into or out of connection within one of the first and second networks of MOS transistors alters a temperature dependence of the output voltage of the band gap circuit.

13. The method according to claim 10, further comprising:

mirroring current through the first network within a current mirroring device including a terminal at which the output voltage of the band gap circuit is taken.

14. The method according to claim 13, wherein the current mirroring device comprises an MOS transistor having a channel width equal to an effective channel width of the first network of MOS transistors.

15. The method according to claim 9, further comprising:

operating the band gap circuit with a minimum rail voltage less than or equal to a band gap for silicon.

16. A band gap circuit comprising:

an amplifier having first and second inputs coupled to first and second nodes, respectively, and operating with a minimum rail voltage less than or equal to a band gap for silicon;

a first bipolar junction transistor coupled to the first node through a resistor and a second bipolar junction transistor directly connected to the second node;

first and second resistors connected to the first and second nodes, respectively, in parallel with the first and second bipolar junction transistors, respectively, wherein an output voltage of the band gap circuit is a function of temperature dependent currents through the first and second bipolar junction transistors and temperature dependent currents through the first and second resistors;

a first network of parallel-connected metal oxide semiconductor (MOS) transistors connected to the first node and a second network of parallel-connected MOS transistors connected to the second node; and at least one MOS transistor that is selectively switched into or out of parallel connection within the second network to alter a current flowing through the second node.

17. The band gap circuit according to claim 16, wherein selectively switching the at least one MOS transistor into or out of connection within the second network alters an effective channel width of the second network.

18. The band gap circuit according to claim 16, wherein selectively switching the at least one MOS transistor into or out of connection within the network alters a temperature dependence of the output voltage of the band gap circuit.

19. The band gap circuit according to claim 16, further comprising:

an MOS transistor mirroring current through the first network and connected to an output resistor, wherein the output voltage of the band gap circuit is taken at a terminal of the current mirroring MOS transistor connected to the output resistor.

20. The band gap circuit according to claim 19, wherein the current mirroring MOS transistor has a channel width equal to an aggregate effective channel width of the first network of MOS transistors and to an aggregate effective channel width of the second network of MOS transistors when the at least one MOS transistor is switched out of connection within the second network.

* * * * *